United States Patent [19]

Johnson

[11] Patent Number: 5,327,672
[45] Date of Patent: Jul. 12, 1994

[54] SLIP BOBBER FOR ICE FISHING

[76] Inventor: Bruce N. Johnson, 8951 Goodrich Rd. #310, Bloomington, Minn. 55437

[21] Appl. No.: 155,388

[22] Filed: Nov. 22, 1993

[51] Int. Cl.$^5$ ............................................. A01K 93/00
[52] U.S. Cl. .................................. 43/44.91; 43/44.85; 43/44.88
[58] Field of Search .................... 43/44.91, 44.9, 44.85, 43/44.87, 44.88, 44.92, 44.93, 44.95, 43.11

[56] References Cited

U.S. PATENT DOCUMENTS

| | | | |
|---|---|---|---|
| 1,122,359 | 12/1914 | Bissett | 43/44.91 |
| 1,468,720 | 9/1923 | Low | 43/44.91 |
| 2,379,676 | 7/1945 | Blackstone | 43/44.88 |
| 2,503,793 | 4/1950 | Breemes | 43/44.91 |
| 2,581,259 | 1/1952 | Keen | 43/44.91 |
| 4,251,941 | 2/1981 | Howard | 43/44.91 |

Primary Examiner—P. Austin Bradley
Assistant Examiner—Chuck Y. Mah
Attorney, Agent, or Firm—Herman H. Bains

[57] ABSTRACT

A slip bobber for use in ice fishing is formed of a buoyant, water impervious, plastic material. The slip bobber is provided with an elongate vertical passage therethrough for accommodating a fishing line. The slip bobber also includes a transverse passage therein for receiving a locking element. The locking element has an opening therein through which the fishing line extends. The locking element is shiftable between a release position wherein the fishing line is freely movable through the bobber and locking position. The fishing bobber is locked to the fishing line in the locked position but is readily shiftable to the release position when the fishhook is set by the fisherman.

9 Claims, 1 Drawing Sheet

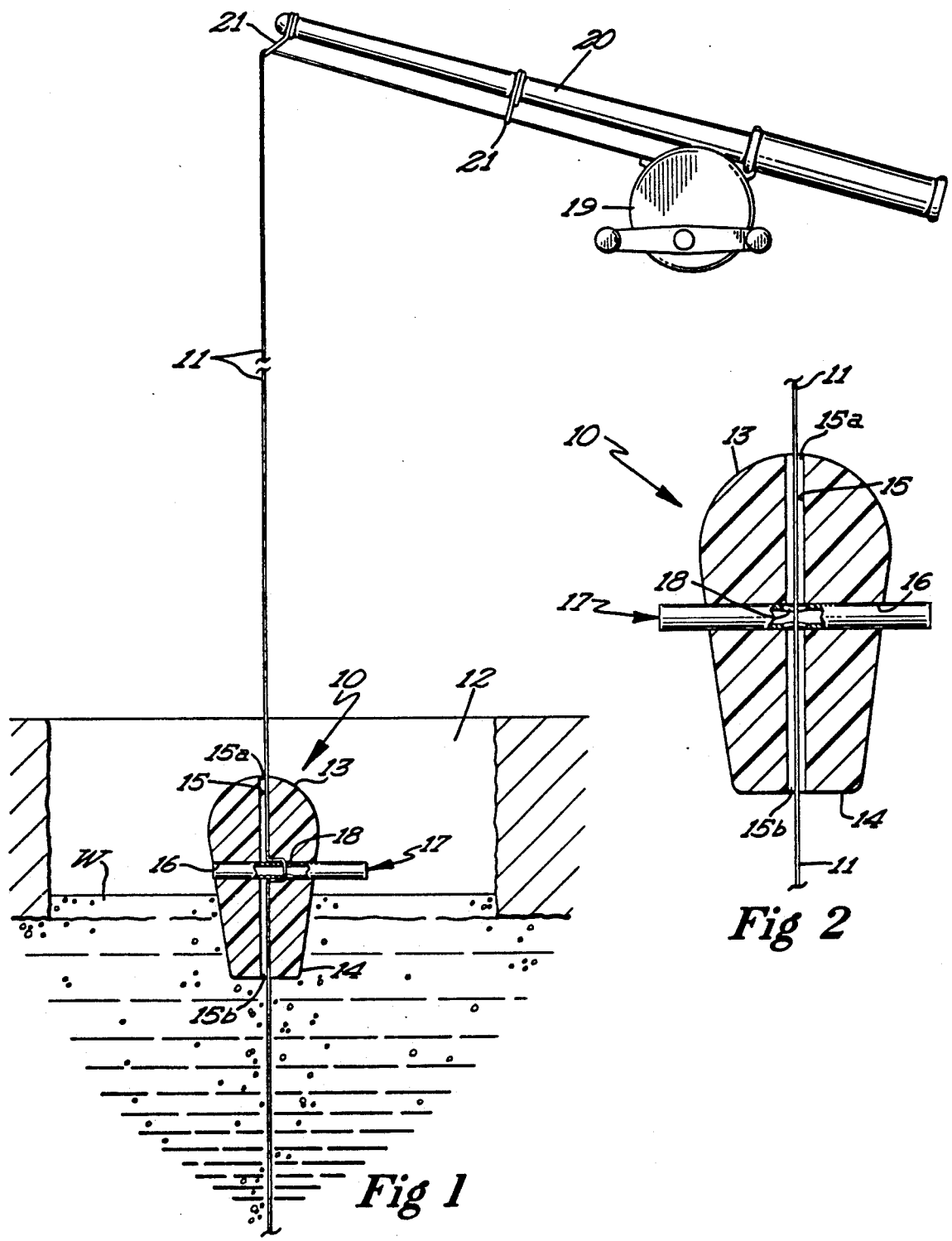

5,327,672

SLIP BOBBER FOR ICE FISHING

FIELD OF THE INVENTION

This invention relates to fishing bobbers and more specifically to fishing bobbers used in ice fishing.

BACKGROUND OF THE INVENTION

In ice fishing, the selected depth for the baited hook or lure is determined by the position of a bobber on the fishing line. Some ice fishermen manually hold the fishing line and retrieve a hooked fish by the typical hand over hand technique. Other fishermen prefer to use the conventional short rod and a reel attached thereto. However, when a rod and reel are used in ice fishing, the fishing bobber cannot pass the eye on the rod when the line is reeled in.

Slip bobbers are available which permit the bobber to slip relative to the line when the hook is set and are intended to permit the line to be reeled in while the bobber remains stationary. These slip bobbers use stop elements on the line for holding the bobber at a predetermined position on the line. However, it is sometimes difficult to move a stop element through the eye of the rod when the line is being retrieved.

SUMMARY OF THE INVENTION

It is an object of this invention to provide a novel slip bobber, of simple and inexpensive construction, which is releasably locked to the fishing line for providing the desired fishing depth but which readily releases when the hook is set. The novel slip bobber is especially adapted for ice fishing and is preferably constructed of a light weight material and has an elongate vertical passage therethrough for accommodating the fishing line.

The fishing bobber is provided with a transverse passage which communicates with the vertical passage and which accommodates a locking element therein. The locking element has an opening therethrough and the locking element is shiftable between a release and locked position.

When the locking element is in the locked position, the opening therethrough is displaced from aligned relation with the vertical passage through the bobber to frictionally hold the line in a selected position. However, when the fish hook is set by the fisherman, the reaction forces shift the locking element to the release position to align the opening in the locking element with the vertical passage through the bobber and thereby permit slippage of the line relative to the bobber.

FIGURES OF THE DRAWING

FIG. 1 is a cross-sectional view of a novel slip bobber in the locked position for permitting a fishing line to move relative to the bobber.

FIG. 2 is a cross-sectional view of the novel slip bobber in the release position with respect to the fishing line.

DESCRIPTION OF THE PREFERRED EMBODIMENT

Referring now to the drawings, it will be seen that one embodiment of my the novel slip bobber, designated generally by the reference numeral 10, is thereshown. The bobber is illustrated in the locked position in FIG. 1 and in the release position in FIG. 2. The novel slip bobber 10 is formed of a buoyant, generally liquid impervious plastic material, preferably steam baked virgin polysterene and is of symmetrical configuration. It is difficult, if not impossible, to drill symmetrical openings through other expanded plastic materials. In the embodiment shown, the slip bobber 10 is generally of elongate tear drop configuration and includes a small end portion 13 which flares to a large end portion 14.

It will be seen that when the slip bobber 10 is positioned in the water W, of an ice fishing hole 12, the bobber naturally assumes the position shown so that its longitudinal axis is vertically disposed. In the embodiment shown, the smaller end 13 is disposed downward. However, it is pointed out that the slip bobber 10 could be applied to the fishing line 11 to dispose the large end 15 downwardly. The bobber has a centrally located vertical passage 15 which extends therethrough. In this regard, it will be noted that the vertical passage 15 extends through the upper domed end 15 to exit therefrom at 15a. The passage 15 extends through the smaller lower end 14 of the slip bobber to exit therefrom at 15b. The passage 15 has a cross-sectional size to permit the passage of a fishing line 11 therethrough.

The slip bobber 10 is also provided with a substantially centrally located transverse passage 16 therethrough which communicates with the vertical passage 15. An elongate tubular lock element 17 is positioned in the transverse passage 16 and has a length dimension substantially greater than the length dimension of the transverse passage. The tubular lock element is formed of polyvinyl chloride having a hardness within the range of 50 to 90 durometers on the A scale and preferably within the range of 65 to 85 durometers. The tubular lock element 17 has a centrally located opening 18 therein extending transversely therethrough. The diameter or size of the opening 18 corresponds to the cross sectional size size of the vertical passage 15. The diameter of the lock element 17 is slightly smaller than the diameter of the passage 16.

The tubular lock element 17 is longitudinally shiftable or translatable between a locked position and a release position. When the tubular lock element is in the release position, the opening 18 in the lock element is disposed in registering or aligned relation with the vertical passage 15 as shown in FIG. 2. When the lock element 17 is in the release position, the fishing line 11 will readily move relative to the bobber 10. It will be noted that opposite ends of the lock element 17 project an equal amount from the bobber surface when the lock element is in the release position.

When the lock element 17 is in the lock position, the opening 18 through the lock element will be displaced laterally with respect to the vertical passage as illustrated in FIG. 1. The slip bobber 10 will be locked to the fishing line by the interaction of the lock element 17 with the internal surface of the transverse passage 16. The slip bobber 10 is therefore locked in this position so that the depth of the baited hook or lure may be selectively adjusted. It will be noted that one end of the lock element is flush with the outer surface of the slip bobber 10 when the lock element 17 is in the lock position. The lock element 17 may be readily pushed in either direction from the release position to the lock position.

The fishing line 11 is illustrated with a conventional short rod 20 typically used in ice fishing. The rod 20 has one or more eyes 21 secured thereto for guiding the line to the reel 19. The use of a short rod allows the fisherman to use a jigging technique if desired.

When the slip bobber 10 is used during ice fishing, the user will releasably lock the slip bobber to the line 11 at a selected depth. When the fish takes the bait or lure, the fisherman will jerk upwardly with the rod to set the hook in the conventional way and this jerking motion exerts a laterally directed force on the lock element 17 by interaction of the line with the lock element. The lock element 17 will then be shifted from the locked position, as illustrated in FIG. 1, to the release position as illustrated in FIG. 2. The user may then reel in the line 11 which moves relative to the slip bobber 10 as the latter floats on the surface of the water. This obviates the need to reel the fish in manually by the hand over hand technique since the slip bobber 10 remains stationary on the surface of the water.

The construction and operation of the slip bobber 10 allows a user to readily apply and/or remove a bobber from a line more quickly than with the use of a conventional bobber. Because of the specific construction and manner of operation of the slip bobber, it has been found that it is highly unlikely that the slip bobber 10 will be frozen in the locked position or release by reason of the water freezing the lock element 17 in the transverse passage 16. The tubular construction of the lock element 17 allows easy quick drainage of the water therefrom. It is pointed out that the slip bobber 10 may have other configurations than the teardrop shape of the present embodiment, for example, the slip bobber may be of spherical configuration.

Thus, it will be seen that I have provided a novel and improved slip bobber which allows a fisherman to reel in a fish in the conventional manner. This manner of operation makes the slip bobber especially adaptable for ice fishing. It will also be seen that I have provided a novel slip bobber, of simple and inexpensive construction, which functions in a more efficient manner than any heretofore known comparable bobber.

What is claimed is:

1. A slip bobber for use with a fishing line and being especially adaptable for ice fishing,
    said slip bobber being formed of a bouyant, generally liquid impervious plastic material and having a symmetrical configuration,
    said bobber having an elongate vertical passage therethrough for receiving a fishing line therethrough, said vertical passage having a cross-sectional size to allow the fishing line to move through the passage relative to the bobber,
    said bobber having an elongate transverse passage therethrough communicating with said vertical passage,
    an elongate locking element extending through said transverse passage and having a length dimension greater than the length dimension of said transverse passage, said locking element having a transverse opening therethrough for receiving the fishing line therethrough, the axis of said transverse opening through the locking element being disposed substantially normal with respect to the longitudinal axis of the locking element, said locking element being shiftable between a locking position and a release position, said transverse opening through the locking element being disposed in aligned relation with a vertical passage when the locking element is in the release position to permit the fishing line to move freely through the vertical passage, said transverse opening in the locking member being disposed in offset relation to said vertical passage when said locking element is in the locking position for binding the bobber to the fishing line at a selected position to permit a user to select a predetermined fishing depth, said locking element being shifted from the locking position to the release position when the fishing line is subjected to an upward jerking force as the fisherman sets the hook.

2. The slip bobber as defined in claim 1 wherein said bobber is of elongate tear drop configuration.

3. The slip bobber as defined in claim 1 wherein said locking element is of tubular construction.

4. The slip bobber as defined in claim 1 wherein said transverse passage is located at substantially the transverse center of said bobber.

5. The slip bobber as defined in claim 1 wherein said locking element is longitudinally translated when shifted between the locked and release positions.

6. The slip bobber as defined in claim 1 wherein said locking element, when in the locking position, having one end thereof disposed in flush relation with the surface of the bobber.

7. The slip bobber as defined in claim 1 wherein said bobber is formed of steam baked, virgin polystyrene.

8. The slip bobber as defined in claim 7 wherein said locking element is formed of polyvinyl chloride having a hardness within the range of 50 to 90 durometers.

9. The slip bobber as defined in claim 7 wherein said locking element 9 is formed of polyvinyl chloride having a hardness within the range of 65 to 80 durometers.

* * * * *